March 31, 1953 — F. A. KROHM — 2,632,909

CONNECTOR FOR WINDSHIELD WIPER BLADES AND ARMS

Filed Oct. 1, 1947

INVENTOR.
FRED A. KROHM
BY
Charles S. Perfold
ATTORNEY

Patented Mar. 31, 1953

2,632,909

UNITED STATES PATENT OFFICE 2,632,909

CONNECTOR FOR WINDSHIELD WIPER BLADES AND ARMS

Fred A. Krohm, Gary, Ind., assignor to Productive Inventions, Inc., a corporation of Indiana Application October 1, 1947, Serial No. 777,204

6 Claims. (Cl. 15—250)

This invention relates to windshield wipers and particularly to means for assembling the actuating arm and the wiper blade in operative relationship.

Windshield wiper actuating arms have a longer life than the wiper blades with the result that wiper blades of current manufacture must be adapted to operate with various types of actuating arms which have been used to equip automotive vehicles.

An object of the invention is to provide a novel connecting means between actuating arms having a shallow curved hook on the free end and wiper blades not constructed to operate with such arms.

A particular object of the invention is to provide a novel one piece connector member adapted to be connected and removed from a wiping blade element and the actuating arm therefor.

An important object of the invention is to provide a connecting element which cannot be removed from the actuating arm until after it is detached from the wiper blade.

A further object of the invention is to provide a connecting adapter element of the character indicated which is inexpensive to manufacture, of durable construction and of high efficiency in service.

Other objects and advantages of the invention will appear after the description hereinafter set forth is considered in conjunction with the drawing annexed hereto.

One embodiment of the invention is shown for illustrative purposes in the accompanying drawing, in which, Figure 1 is an enlarged perspective view of the connector element;

Figure 3:
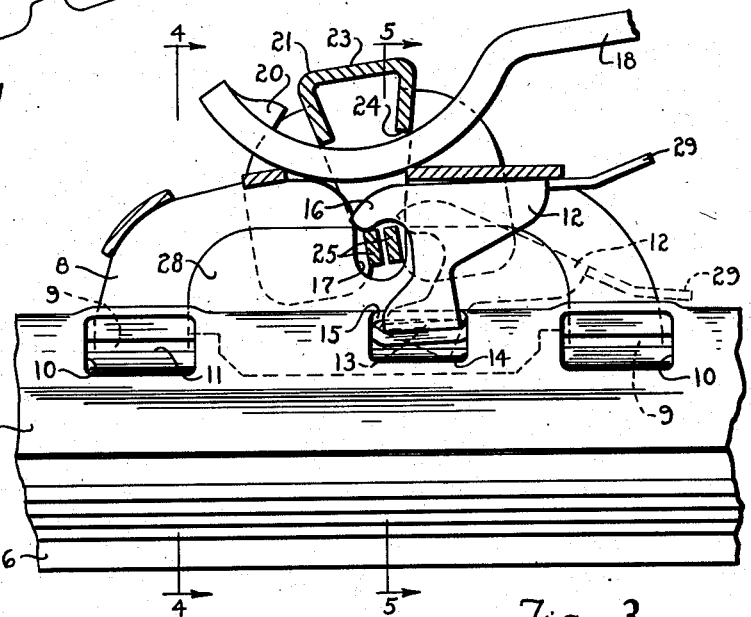
Figure 3 is an enlarged fragmentary side elevational view of the connector element employed to connect the free shallow curved hook end of a windshield wiper actuating arm and a wiper blade assembly in operating relationship.
Figure 4:
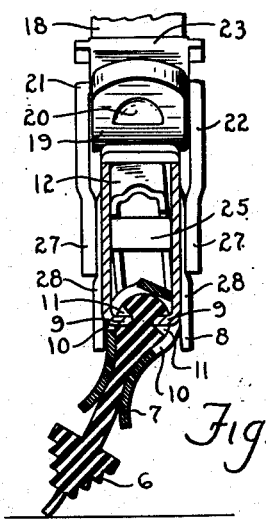
Figure 4 is an enlarged transverse sectional view taken substantially as indicated by the line 4—4 of Figure 3.
Figure 5:
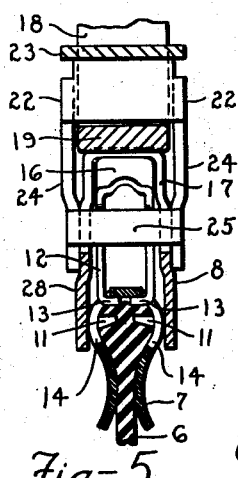
Figure 5 is an enlarged transverse sectional view taken substantially as indicated by line 5—5 of Figure 3.

Referring particularly to Figures 3 through 5 of the drawing, the present invention is shown operatively connecting a windshield wiper blade to a wiper actuating arm. The wiper blade comprises cleaner means preferably in the form of a resilient wiping element 6, a channel support or holder 7 therefor, and a connector means or member 8 attached to and supported by the resilient wiping element 6 by means of two sets of inturned integral lugs or teeth 9 extending through clearance openings 10 in each side of the channel support or backing 7 and engaging slots or grooves 11 preferably formed throughout the length of resilient wiping element 6. That portion of the wiping element in the channel which influences the operation of the connection means constitutes resilient means which serves a functional use independently of the wiping edge of the element. The connection means 8 may include a manually operable latch 12 resiliently supported by and pivoted on the resilient wiping element 6 by means of integral inturned projections 13 which extend through clearance openings 14 in each side of the channel support 7. More specifically in this respect, the projections 13 are inserted for disposition between the top of the resilient element 6 and the under side of the metal bridge or base portion 15 of the support 7 separating the openings 14. The latch 12 is provided with a holding portion 16 which normally serves as an upper closure for an opening or recess 17 provided in the member 8, such recess being adapted to receive an entering part carried by a wiper arm.

The connection means 8 and latch 12 and manner of connecting them to the wiper blade is claimed in my copending application, Serial No. 311,425 filed September 25, 1952.

A typical wiper actuating arm 18 for use with the invention includes a shallow curved hook 19 provided with an integral retaining lug or projection 20, formed adjacent to the end of the hook.

The wiper blade and actuating arm as described are illustrative of blades and arms in current use which cannot be connected to operate without additional connector means as provided by the present invention.

Figure 1:
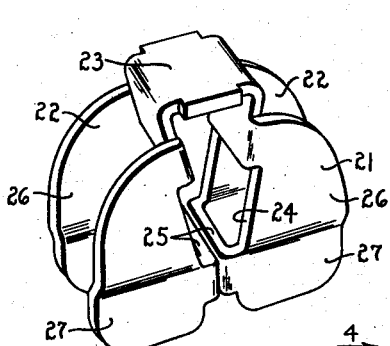

The connector for operatively connecting the hook portion 19 of the actuating arm 18 to the wiper blade member 8 is indicated as a whole by the numeral 21 in Figure 1. The connector is preferably constructed in one piece and, among other things, includes two outwardly facing channel-sections or U-shaped legs 22 and a bridge portion 23 joining the legs 22 together in an angular relationship. The base or bottom wall of each leg is provided with an aperture 24. These apertures are substantially aligned and form an opening through which the hook 19 of the arm extends. Each leg is further provided with a bridge portion 25, such portions being closely related to constitute a part adapted for entry into the recess 17 in the member 8.

Figure 2:
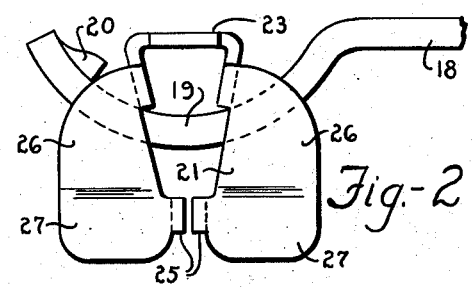
Figure 2 is an enlarged side elevational view of the connector element applied to the free shallow curved hook end of a windshield wiper actuating arm.

To use the connector 21, it is first loosely assembled on the hook 19 of the arm 18 as exemplified in Figure 2, and then the bridge portions or members 25 constituting the entering part are inserted in the opening or recess 17 in the member 8. The sides or wings 26 of the legs 22 of the connector are preferably offset inwardly as indicated at 27 to straddle and engage the sides 28 of member 8 to impart stability and assist in controlling the activities of the parts comprising the assembly. The arrangement is preferably such that the entering part upon insertion into the recess 17 will cause retraction of the latch 12 against the resistance of the resilient wiper element 6, as indicated by the dotted lines of the latch 12 in Figure 3, and when such part is properly seated in the recess the latch will snap back to its normal latched position to securely lock the part to member 8 and at the same time prevent removal of the arm from the connector due to the lug 20 on the arm.

To dissassemble the parts, it is merely necessary to manually engage the lever 29 on the latch 12 to retract the latch so that the connector may be withdrawn from the recess 17, after which the connector may be separated from the arm.

The opening, formed in the connector by the apertures 24, and the hook 19 of the actuating arm 18 are preferably so constructed and arranged that the connector may readily adjust itself with respect to the arm and to the member 8 in order that the resilient wiping element will contact the glass or surface to be cleaned in the desired manner. More specifically in this respect, the connector may slide or pivot with respect to the arm in a plurality of directions and at the same time properly adjust itself with respect to member 8 as the blade is directed back and forth across the windshield or other surface to be cleaned.

If found desirable the connector may be constructed so that one of the legs may be omitted.

Having thus described my invention in connection with certain specified embodiments, it will, of course, be understood that I do not wish to be limited thereto, since it is apparent that modifications may be made in such embodiments and the materials thereof without departing from the spirit and scope of my invention as set forth in the appended claims.

I claim:

1. A connector for connecting a wiper blade to an entering part on a wiper arm, said connector comprising a pair of channel-shaped legs connected together by a bridge portion, each of said legs having side walls and a base wall, an aperture formed in the base wall of each leg, said apertures being arranged to provide an opening for the reception of an entering part of a wiper arm, and the side walls of said legs being arranged for disposition on opposite sides of said entering part.

2. A connector for connecting a wiper blade to an entering part on a wiper arm, said connector comprising a pair of channel-shaped legs, each leg having side walls and a base wall provided with a bridge member, an aperture provided in each base wall, said apertures forming an opening for receiving an entering part of an actuating arm, and the side walls of said legs being adapted for disposition on opposite sides of a part of a wiper blade in a manner whereby the bridge member may be connected with the blade.

3. In a windshield wiper, the combination with a wiper blade having a holding member thereon and an actuating arm therefor, of a connector comprising an upper bridge member suspended from said arm, two channel-shaped legs depending from said bridge member and having portions arranged on opposite sides of the holding member, aligned openings in said legs removably receiving said arm, and a lower bridge member arranged generally parallel to the upper bridge member defining the lower end of each leg opening and detachably engaging the holding member on said blade.

4. A connector for joining a windshield wiper blade provided with locking means and an actuating arm provided with an entering part, said connector comprising a body provided with an opening defined by upper and lower bridge means for the reception of said part, said locking means serving to engage the lower bridge means and detachably hold the connector to the wiper blade and to an entering part.

5. A one-piece connector for establishing a detachable connection between an entering part on the end of a windshield wiper arm and an individual attachment normally carried by a wiper blade, said connector consisting of a pair of opposed substantially planar walls connected together by an upper bridge portion, an aperture provided in each wall, said apertures being aligned to provide an opening arranged substantially transverse to the planes of the walls for receiving an entering part, said walls being formed to provide portions spaced from the bridge portion for connection with the attachment, and said walls also having wing portions arranged substantially transverse to the planes of the walls for disposition on opposite sides of an entering part on an arm and an attachment when connected thereto.

6. In combination: a wiper blade comprising an elongated support, an elongated wiping element attached to said support, a connector carried by the blade, a latch operatively related to the connector, an opening provided in the connector, an adapter having an inner portion seated in the opening and having an outer portion spaced from the connector, a wiper arm having an entering part arranged between the outer portion of the adapter and the connector, the relationship between the outer portion of the adapter, connector and the entering part being such that when the inner portion of the adapter is locked in the opening by the latch the entering part on the arm will be held between the outer portion of the adapter and the connector.

FRED A. KROHM.

REFERENCES CITED

The following references are of record in the file of this patent:

UNITED STATES PATENTS

| Number | Name | Date |
|---|---|---|
| 1,872,095 | Romano | Aug. 16, 1932 |
| 2,156,506 | Marcolivio | May 2, 1939 |
| 2,170,939 | Christen | Aug. 29, 1939 |
| 2,172,928 | Anderson | Sept. 12, 1939 |
| 2,260,905 | Horton | Oct. 28, 1941 |
| 2,274,277 | Rousseau | Feb. 24, 1942 |
| 2,280,566 | Zaiger | Apr. 21, 1942 |
| 2,284,823 | Horton | June 2, 1942 |
| 2,293,820 | Hansen | Aug. 25, 1942 |
| 2,295,011 | Rodrick | Sept. 8, 1942 |
| 2,432,689 | Smulski | Dec. 16, 1947 |
| 2,432,693 | Anderson | Dec. 16, 1947 |